United States Patent
Brisebois et al.

(10) Patent No.: US 10,044,764 B2
(45) Date of Patent: Aug. 7, 2018

(54) CONTEXT-AWARE DELEGATION ENGINE

(71) Applicant: Quest Software Inc., Aliso Viejo, CA (US)

(72) Inventors: Mitch Brisebois, Renfrew (CA); Olivier Le Rudulier, Halifax (CA)

(73) Assignee: Quest Software Inc., Aliso Viejo, CA (US)

( * ) Notice: Subject to any disclaimer, the term of this patent is extended or adjusted under 35 U.S.C. 154(b) by 373 days.

(21) Appl. No.: 14/980,009

(22) Filed: Dec. 28, 2015

(65) Prior Publication Data
US 2017/0187753 A1    Jun. 29, 2017

(51) Int. Cl.
*H04L 29/06*    (2006.01)

(52) U.S. Cl.
CPC .......... *H04L 63/205* (2013.01); *H04L 63/105* (2013.01)

(58) Field of Classification Search
CPC .................. H04L 63/105; H04L 63/205
See application file for complete search history.

(56) References Cited

U.S. PATENT DOCUMENTS

| | | | | |
|---|---|---|---|---|
| 6,158,010 A * | 12/2000 | Moriconi | ........... | G06F 21/552 709/223 |
| 9,418,213 B1 * | 8/2016 | Roth | ........... | G06F 21/31 |
| 2005/0257245 A1 * | 11/2005 | Patrick | ........... | H04L 63/0263 726/1 |
| 2013/0276142 A1 * | 10/2013 | Peddada | ........... | G06F 21/62 726/28 |

* cited by examiner

*Primary Examiner* — Khoi V Le
(74) *Attorney, Agent, or Firm* — Kirton McConkie; Brian Tucker (57) ABSTRACT

A context-aware delegation engine can enable an account owner to identify granular criteria (or context) that will be used to determine what content a delegate will have access to. The account owner can therefore leverage a wide range of information to dynamically determine whether a delegate will receive access to particular content. The delegation engine can be configured to provide a delegation policy to be evaluated to determine whether a delegate should receive access to particular content. Such a delegation policy can be generated based on input provided by the delegator thereby providing the delegator with fine-grained control over which content will be accessible to a particular delegate. The delegation policy can be structured in accordance with an authorization protocol schema such as XACML, SAML, OAuth 2.0, OpenID, etc. to allow the evaluation of the delegation policy to be performed by a policy decision point in such authorization architectures.

20 Claims, 8 Drawing Sheets

CONTEXT-AWARE DELEGATION ENGINE

CROSS-REFERENCE TO RELATED APPLICATIONS

N/A

BACKGROUND

The present invention is generally directed to a context-aware delegation engine. In particular, the context-aware delegation engine of the present invention can enable an account owner (or delegator) to control the delegation of access to his or her content at a granular level.

Delegation of access is a common feature in many personal information managers (i.e., software applications that provide access to one's emails, calendar items, contacts, files etc.). For example, Microsoft Outlook provides a "Delegate Access" feature by which the account owner can grant certain types of permissions to another user including permission to read, create, and/or modify emails, calendar items, tasks, etc.

When the account owner delegates access to another user (referred to as a "delegate"), the delegate can access the account owner's folders in much the same way that the delegate accesses his or her own folders. For example, if the account owner grants full permissions to a delegate within the account owner's inbox, the delegate will be able to read and modify any items stored within the inbox (including sub-folders) as well as send new emails on behalf of the account owner. Similarly, even if the account owner only grants read access to the delegate, the delegate will still be able to view any email or other content stored within the account owner's inbox.

A number of access control systems (or authorization architectures) exist for controlling a user's access to particular content. For example, XACML, which is an example of an Attribute Based Access Control (ABAC) system, has become a standard for access control systems. A XACML system is a "decoupled" system designed to separate the decision point from the point of use. Other authorization architectures such as SAML, OAuth 2.0, and OpenID are similarly decoupled.

Figure 1:
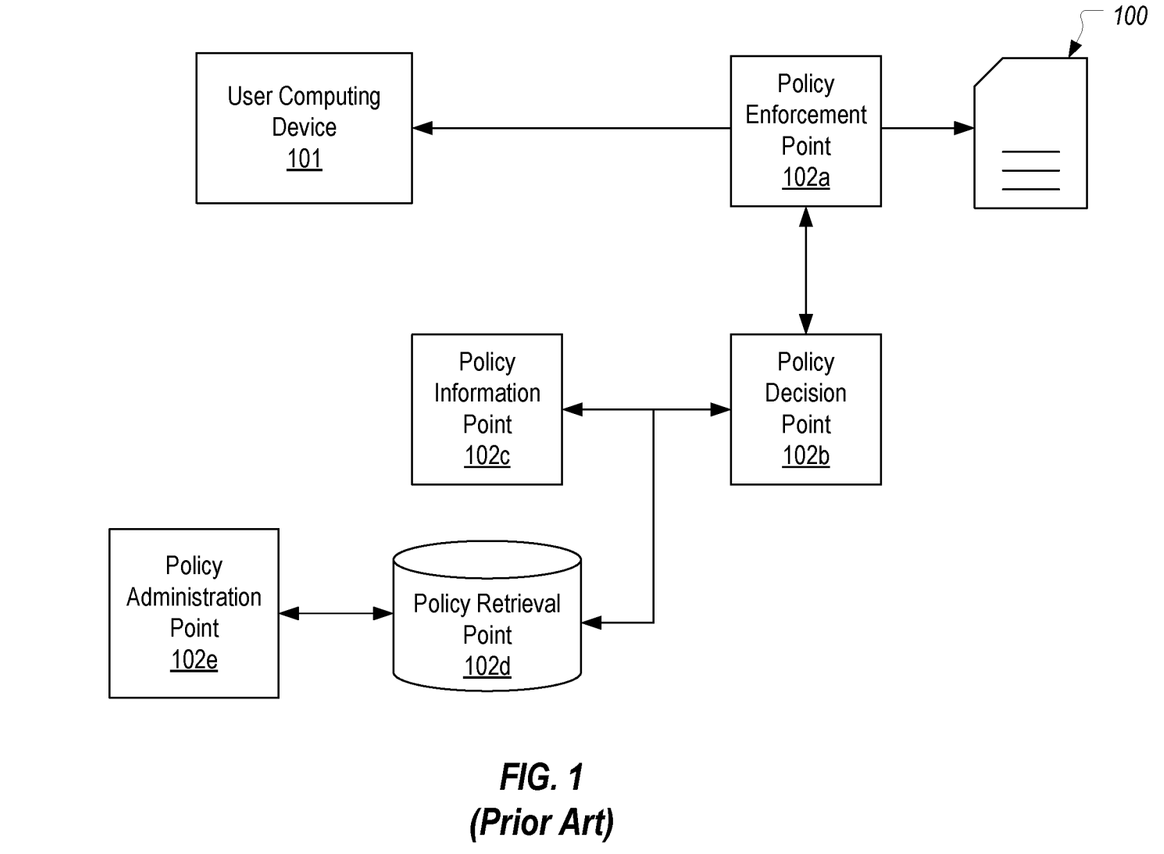
FIG. 1 illustrates a prior art XACML architecture to provide context of one particular authorization environment in which the present invention could be implemented.

FIG. 1 provides a general illustration of the XACML architecture and serves to illustrate the general structure of an authorization architecture within which the present invention could be implemented. As shown, a policy enforcement point 102a acts as a "gateway" between a user computing device 101 and a document 100 that the user would like to access. Accordingly, whenever the user submits a request to access document 100, policy enforcement point 102a will intercept the request and communicate with policy decision point 102b to determine whether the request should be allowed. Policy decision point 102b is configured to access policy retrieval point 102d to obtain a policy applicable to document 100 and evaluate it to determine whether the request should be granted. A policy administration point 102e can be employed to define and store these policies in policy retrieval point 102d.

In some cases, the policy and request alone may not provide sufficient information to make a determination. In such cases, policy decision point 102b can request that policy information point 102c provide the necessary information. Although not shown, policy information point 102c can be coupled to a number of services (e.g., Active Directory) which can provide the necessary information. Once it has evaluated the request against the policy, policy decision point 102b can instruct policy enforcement point 102a to either allow or deny the request.

It is important to note that this access control process is employed when the user makes a direct request to access content. In other words, a first user's attempt to access a particular document will be evaluated by applying the first user's attributes to the applicable policy. However, in the context of delegation, the access control process is not invoked in this manner. For example, if an account owner delegates access to his inbox to the first user, the first user will be able to read all emails in the inbox even if a policy would have otherwise prevented the first user from directly accessing the emails. In other words, as a delegate of the account owner, the first user will be able to access the inbox as if he or she were the account owner (subject to any permissions specified by the account owner).

BRIEF SUMMARY

The present invention extends to methods, systems, and computer program products for implementing a context-aware delegation engine. The context-aware delegation engine of the present invention can enable an account owner to identify highly granular criteria (or context) that will be used to determine what content a delegate will have access to. In this way, the account owner is not limited to the "all or nothing" delegation features that are currently available, but can leverage a wide range of information to dynamically determine whether a delegate will receive access to particular content.

In some embodiments, the context-aware delegation engine can be configured to provide a delegation policy which can be evaluated to determine whether a delegate should receive access to particular content. Such a delegation policy can be generated based on input provided by the delegator thereby providing the delegator with fine-grained control over which content will be accessible to a particular delegate. These delegation polices can be structured in accordance with any of the currently available authorization protocol schemas such as, for example, XACML, SAML, OAuth 2.0, OpenID, as well as in accordance with any other authorization protocol schemas that may be developed. In other words, the present invention can be implemented in a number of different authorization protocol environments.

In one embodiment, the present invention is implemented as a method for creating and applying a delegation policy. One or more delegation conditions can be received from an account owner. Each delegation condition defines one or more contexts to be used to limit a delegate's access to the account owner's content. A delegation policy can be created and stored based on the one or more delegation conditions. A request from the delegate to access the account owner's content can then be received. The request can be evaluated against the delegation policy to limit which items of the account owner's content are made accessible to the delegate.

In another embodiment, the present invention is implemented as a delegation system that includes: a delegation policy retrieval point configured to store delegation policies, each delegation policy including at least one delegation condition specified by an account owner to limit a delegate's access to the account owner's content; a delegation policy information point configured to retrieve context for use when evaluating a delegation policy; a delegation policy decision point configured to evaluate a corresponding delegation policy against a delegate's request to access an account owner's content, wherein evaluating the delegation policy includes identifying which items of the account owner's content have context matching the at least one delegation condition included in the delegation policy; and a delegation policy enforcement point configured to receive the delegate's request to access the account owner's content and respond by providing access only to the items of the account owner's content that the delegation policy decision point indicates have context matching the at least one delegation condition included in the delegation policy.

In another embodiment, the present invention is implemented as a method for enabling an account owner to limit the delegation of access to the account owner's inbox to a subset of the content within the inbox. Input is received, from the account owner and via a delegation user interface, and specifies that a user should be delegated access to the account owner's inbox and that the delegated access should be limited to content within the inbox that matches one or more contexts. A delegation policy is generated based on the received input. In response to a request from the user to access the account owner's inbox as a delegate, the delegation policy is evaluated to identify which items of content within the inbox match the one or more contexts and enable the user to access only the items of content that match the one or more contexts.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "context" should be construed as any classification, categorization, or characteristic of an item of content or of a user. A context provider is any system that can provide such content. Similarly, a delegation condition defines a limit on what is delegated based on one or more contexts of the items that could potentially be delegated and/or one or more contexts of a user or group of users to which the items may potentially be delegated. A delegation policy is a data structure that defines one or more delegation conditions. The term "account owner" should be construed as an individual or entity that has rights to access content and the ability to delegate such rights.

Figure 2:
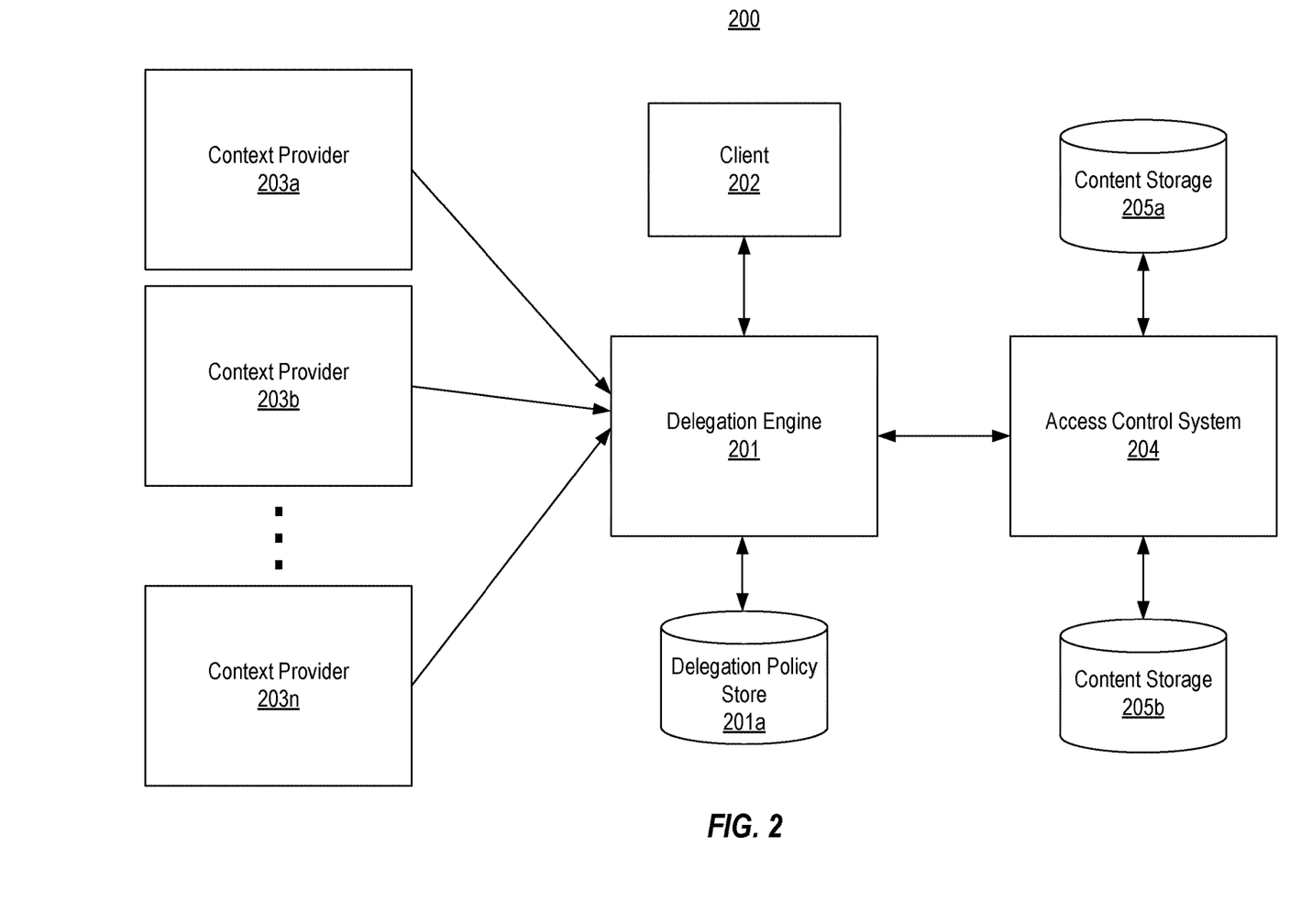
FIG. 2 illustrates an example computing environment in which the present invention can be implemented.

FIG. 2 illustrates an example computing environment 200 in which the present invention can be implemented. Computing environment 200 includes a delegation engine 201 and a client computing device (or simply "client") 202 that is in communication with delegation engine 201. Client 202 can run a personal information manager, such as Microsoft Outlook, to allow a user of client 202 to manage his or her emails, calendar items, tasks, contacts, files, etc. The items that can be accessed via the personal information manager will hereinafter be referred to generally as content.

In accordance with embodiments of the present invention, the personal information manager can include or otherwise be associated with an interface that allows the account owner (or delegator) to define a number of delegation conditions (or rules) to be included in a delegation policy that will govern the delegation of access to the delegator's content. Delegation engine 201 can be coupled to a delegation policy store 201a which stores such delegation policies. In some embodiments, the definition and management of delegation policies can be at least partially controlled by an administrator. Accordingly, although not shown, an administrator computing device can be coupled to delegation engine 201.

Delegation engine 201 can also be coupled to a number of context providers 203a-203n from which delegation engine 201 can retrieve context to be employed in the delegation process. This context can be particular to an item of content (e.g., an email or file) or to a particular delegate. For example, context providers 203a-203n may include any number of the following services:

a directory service, such as Active Directory, which can provide many different types of context about a user including, for example, a user's location, rank, or role within a business organization;

a business context service for classifying content into business context categories (e.g., identifying whether an email is from a customer, a partner, a competitor, or a non-business-related individual/entity);

a sensitivity classification service for classifying content based on security categories (e.g., secret, restricted, internal, or public); and a trust profile service which identifies a trust level for each user based on the user's historical access behaviors (e.g., whether the user has violated any data loss prevention rules).

The above are just some examples of potential context providers that may be employed to provide context for the delegation process. Any service that can provide context about content or users could be employed in embodiments of the present invention.

Computing environment 200 also includes an access control system 204 that interfaces with delegation engine 201 and content storages 205a, 205b. In some embodiments, access control system 204 can function as the policy decision point of an authorization architecture while content storages 205a, 205b may function as policy enforcement points. As explained in the Background, in a traditional XACML architecture, access control system 204 could be configured to evaluate a user's request to access content on content storages 205a, 205b based on one or more policies. Other authorization architectures also function in a similar manner. The present invention can be implemented in such architectures by configuring access control system 204 to evaluate whether a delegate should receive access to particular content based on a delegator-defined delegation policy.

Figure 3A:
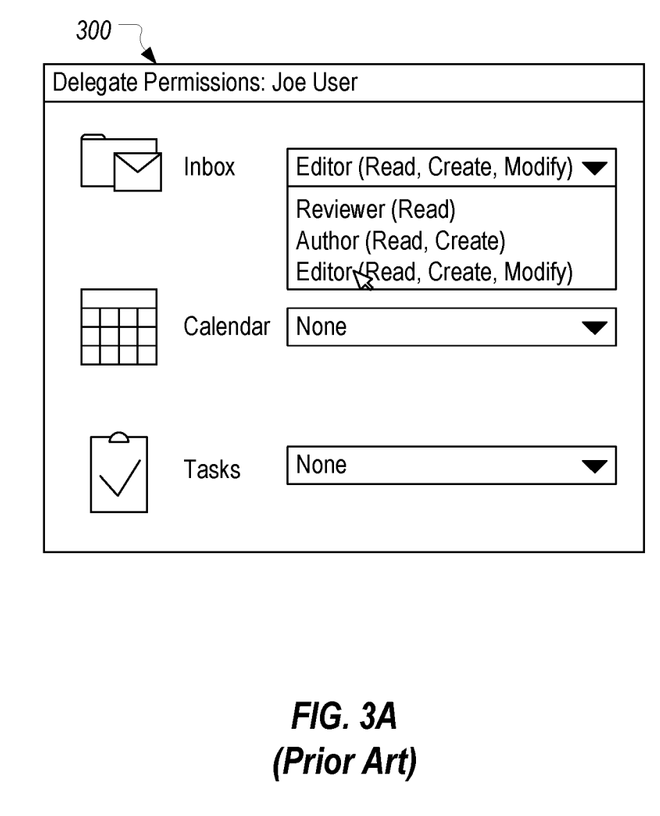
FIG. 3A illustrates an example of a prior art delegation interface which only allows the account owner to limit the type of access to content but does not allow the account owner to limit which content will be accessible to the delegate.

To illustrate the distinction between prior art delegation techniques and those of the present invention, FIG. 3A provides an example of a delegation user interface 300 that is commonly found in versions of Microsoft Outlook. Delegation user interface 300 allows the account owner to specify permissions to a particular delegate which in this example is assumed to be Joe User. As shown, the account owner has few delegation options. In particular, the account owner can delegate reviewer, author, or editor permissions to Joe User for each of the different services provided in Outlook. In this example, it is assumed that the account owner has selected to give Joe User editor access to the inbox. Accordingly, Joe User will be able to read and modify all content within the delegator's inbox and can also create new items within the delegator's inbox (e.g., send emails on behalf of the delegator). The delegator has no ability to limit Joe User's access to only certain content within the inbox.

Figure 3B:
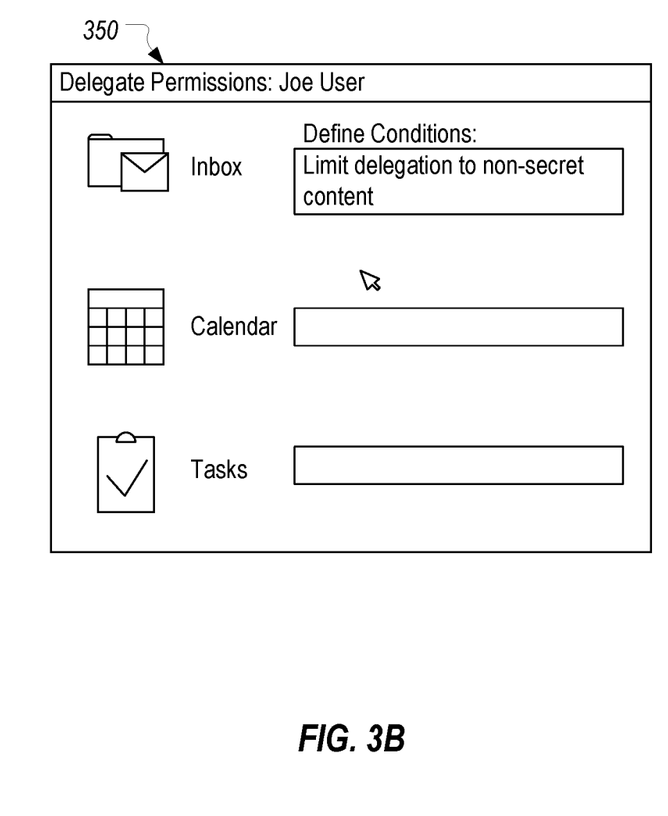
FIG. 3B illustrates a generalized example of a delegation interface that can be employed in embodiments of the present invention to allow the account owner to define a delegation condition for limiting which content will be made accessible to a delegate or group of delegates.

In contrast, FIG. 3B illustrates an example user interface 350 that could be employed in embodiments of the present invention to allow the delegator to have granular control over how content is delegated. In contrast to user interface 300 which only allows the account owner to limit the type of access to the content, user interface 350 allows the account owner to define conditions which will determine whether the delegate will have access to a particular item. For example, FIG. 3B shows that the account owner has defined a delegation condition of "limit delegation to non-secret content." Accordingly, Joe User will only be delegated access to non-secret items within the account owner's inbox.

To further illustrate the distinction between prior art delegation techniques and those of the present invention, consider an example where the account owner's inbox includes three emails, two of which are categorized as secret. In prior art techniques, if Joe User were delegated access to the inbox, he would be able to see all three emails regardless of the permissions specified. In contrast, in the present invention, if Joe User's delegation was limited to non-secret content, he would only see one email—the non-secret email. The process for enforcing such conditions to control which items of content are made available to a delegate will be further described below.

The delegation condition specified in FIG. 3B is merely one example of the type of delegation condition that may be specified using embodiments of the present invention. As described above, a number of different context providers 203a-203n may be utilized to provide context of a particular item of content and/or the delegate. The conditions governing delegation are therefore only limited by the type of context that is obtainable from context providers 203a-203n.

Also, the delegation condition specified in FIG. 3B is an example of a delegation condition that is applicable only to the content. In other words, the delegation condition will be applied to the context of each item in the inbox to determine whether the delegate will receive access to the item as part of the delegation. However, in some embodiments, a delegation condition may be dependent on a context of the delegate alone or on the context of the delegate and the item of content (e.g., delegate access to private emails in the inbox only to users that have a trust level exceeding X and that belong to Group Y). Additional examples of conditions include:

- Limiting delegation to content based on the origin of the content (e.g., based on a domain of the sender's email address which may classify the email as being from a customer, partner, competitor, or personal source). This type of delegation can allow the account owner to easily delegate responsibility to monitor and respond to emails of a particular type.
- Limiting the delegation based on a historical trust analysis of the delegate (e.g., the delegation may specify a group of users and only users in the group having a sufficient "trust level" will be delegated access). This type of delegation can allow the account owner to delegate access to a number of users so that it is more likely that at least one delegate will always be available to act on behalf of the account owner while also ensuring that the delegation will not be granted to an "unsafe" user.
- Limiting the delegation to local access requests (e.g., in the context of delegating access to SharePoint content, the delegate may only be allowed to access content belonging to the delegate's department or other business organization structure. This type of delegation can allow the account owner to easily limit the delegation to the content that is most likely to be relevant to the delegate.

Multiple delegation conditions may be defined to allow a "process-chain" of delegates to be defined. For example, the account owner may define a primary delegation condition that allows a first delegate to access non-secret content. The account owner may also define a secondary delegation condition that allows a second delegate (e.g., a senior manager) to access secret content. These primary and secondary delegation conditions may operate together to create a "process-chain" of delegates. For example, the first delegate may be delegated access to the account owner's inbox so that the first delegate can read and respond to "non-secret" emails. However, if a secret email is received, the first delegate would not be granted access to the secret email based on the primary delegation condition, whereas the second delegate would receive access based on the secondary delegation condition. In this way, the combining or definition of multiple delegation conditions for the same content ensures that the content is made accessible to the appropriate delegate.

Whenever an account owner specifies one or more delegation conditions, a corresponding delegation policy can be created and used to enforce the delegation conditions. FIGS. 4A-4D illustrate a generalized example of how this process can be performed in example computing environment 200.

Figure 4A:
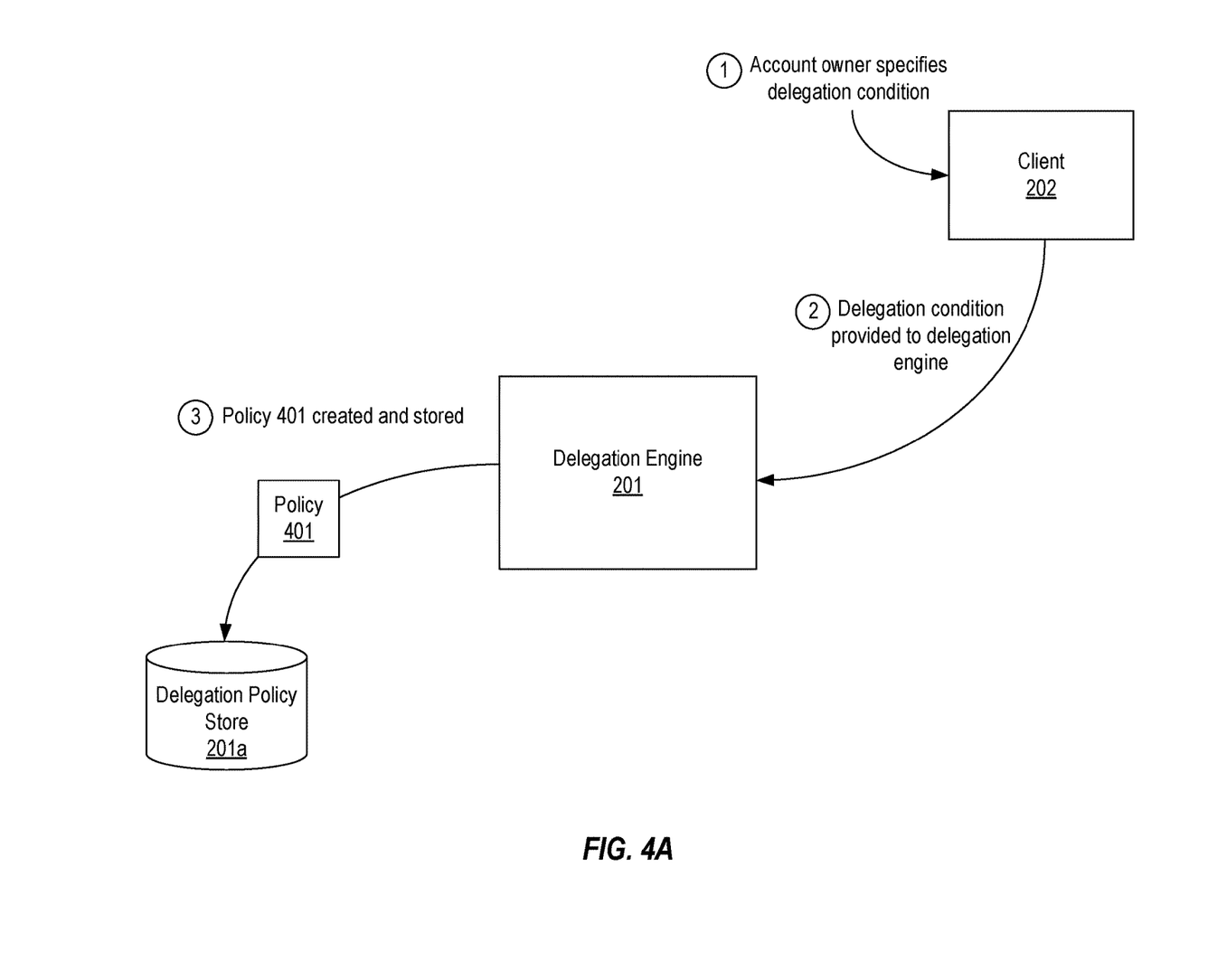
FIGS. 4A-4D illustrate a process of creating a delegation policy and enforcing the delegation policy to limit which content is made accessible to the delegate.

As shown in FIG. 4A, in step 1, the account owner, who is using client 202, specifies a delegation condition. For example, the account owner may access user interface 350 within Microsoft Outlook, another personal information manager, a browser, etc. to input the delegation condition. In this example, it will be assumed that the account owner is delegating access to his inbox to a delegate, Joe User, and that this delegation will be limited to emails that are classified as being from a customer. Stated another way, the delegation condition specifies that an item of content must have a customer context to be delegated. Accordingly, in step 2, client 202 can communicate this delegation condition to delegation engine 201. Delegation engine 201 can then create a policy 401 based on the delegation condition and store the policy in delegation policy store 201a. In some embodiments, policy 401 can be structured in accordance with an authorization protocol schema such as XACML, SAML, OAuth 2.0, OpenID, etc.

Figure 4B:
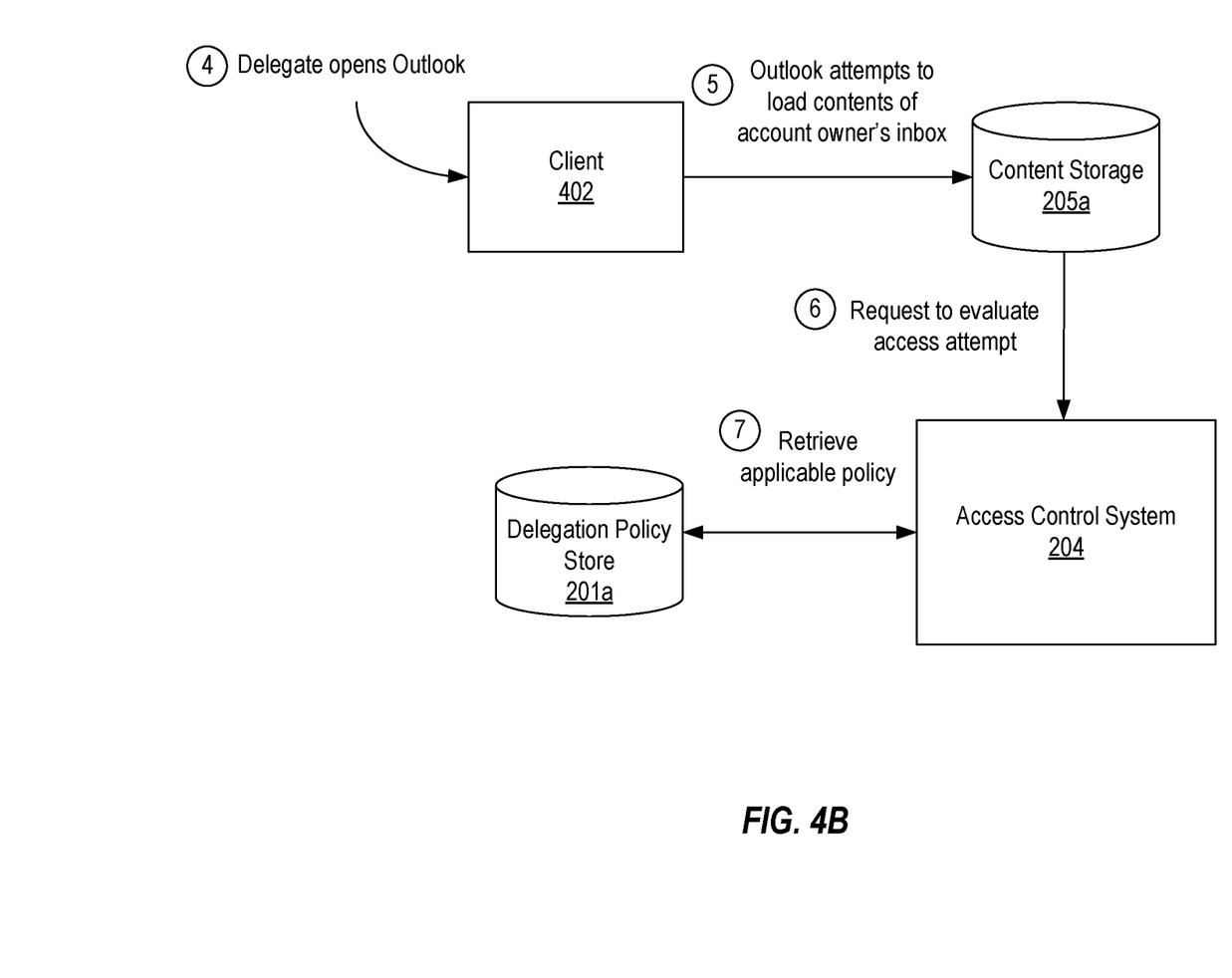

Once stored, policy 401 can be accessed whenever it is necessary to determine which content within the account owner's inbox Joe User should receive access to as a delegate. FIG. 4B illustrates one example of when policy 401 can be evaluated to govern the delegation process. In step 4, Joe User opens his own instance of Outlook on client 402. It will be assumed that Joe User's Outlook instance is already configured to provide access to the account owner's inbox (e.g., by displaying an icon of the delegated inbox in the Outlook navigation pane). As part of opening Outlook on client 402, and in step 5, the Outlook instance on client 402 sends a request to content storage 205a (which is assumed to store the contents of the account owner's inbox) to load the contents of the account owner's inbox.

Prior to allowing client 402 to load any content of the account owner's inbox, in step 6, content storage 205a, which may function as a policy enforcement point in an authorization architecture, can send a request to access control system 204 to evaluate the access attempt. As such, access control system 204 can function as a policy decision point in an authorization architecture. In response, in step 7, access control system 204 can access delegation policy store 201a to retrieve the applicable policy which in this case is policy 401.

Figure 4C:
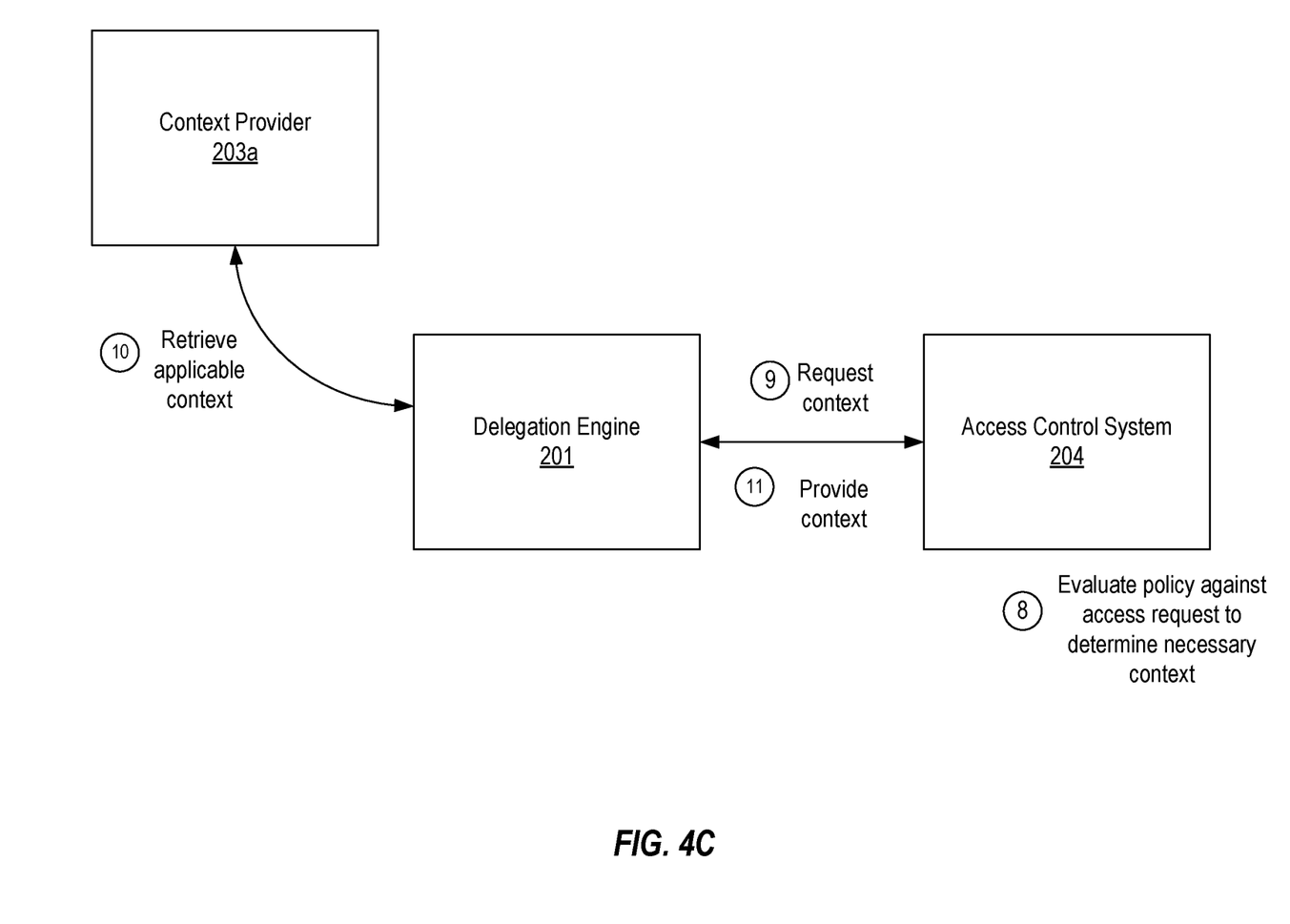

Next, in step 8 as shown in FIG. 4C, access control system 204 can evaluate policy 401 against client 402's attempt to load the content of the account owner's inbox. As indicated above, policy 401 specifies that Joe User is only delegated access to emails that are classified as being from a customer. Based on this evaluation, access control system 204 can determine that it needs to retrieve context of the emails in the account owner's inbox in order to perform the evaluation. Accordingly, in step 9, access control system 204 sends a request to delegation engine 201 for the applicable context. For example, the request in step 9 could provide an identifier of each email in the account owner's inbox and request that a "source classification" be provided for each email. In step 10, delegation engine 201 accesses the appropriate context provider to retrieve the requested context. In this example, it is assumed that context provider 203a provides email classification context. Delegation engine 201 can then provide the requested context to access control system 204 in step 11.

Figure 4D:
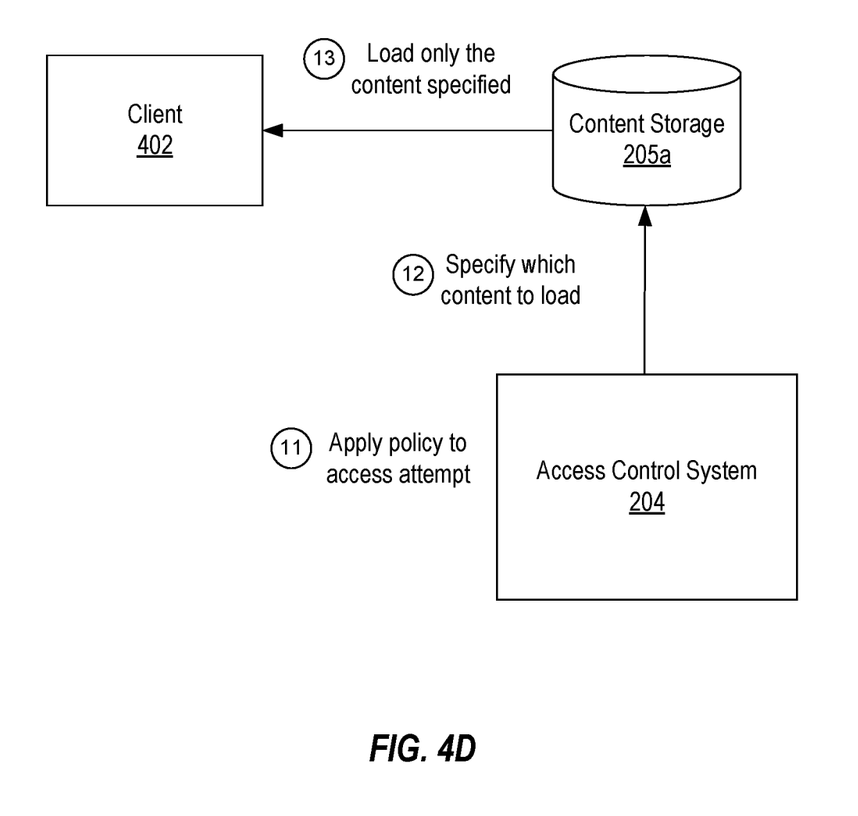

FIG. 4D then illustrates that, once access control system 204 has the necessary context, it can apply policy 401 to client 402's attempt to load the account owner's inbox. Based on policy 401 and the received context, access control system 204 can identify each email within the account owner's inbox that Joe User should be allowed to access. Accordingly, in step 12, access control system 204 specifies which emails can be loaded. Content storage 205a then responds to client 402's request by returning only the emails specified by access control system 204, i.e., only the emails that are classified as being from a customer.

The result of the processing depicted in FIGS. 4A-4D is that Joe User will only see customer emails within the delegated inbox accessible in his instance of Outlook. Any emails in the account owner's inbox that are not classified as being from a customer would not be returned to client 402 based on the enforcement of policy 401. It is noted that Joe User's permissions for the customer emails may also be controlled by the account owner using the techniques of the prior art. For example, in addition to the granular control over which content is made accessible, the account owner may also specify different levels of permissions (e.g., read, create, modify) for operating on the accessible content in accordance with prior art delegation techniques.

The processing illustrated in FIGS. 4B-4D can be substantially repeated whenever a new email or other item is added to the account owner's inbox. For example, if the account owner receives a new email, content storage 205a can request that the new email be evaluated against the applicable policy prior to making the new email available to Joe User on client 402. If the new email happened to be classified as a non-customer email, the processing would prevent the new email from being made accessible to Joe User.

This type of processing can also be employed to create the process-chain of delegates as mentioned above. For example, if the account owner also specified a delegation condition that limited Joe User's access to non-secret customer emails, the account owner could also define a delegation condition that grants a second delegate access to secret emails. In this case, when the new email is received, prior to providing Joe User and the second delegate access to the new email, content storage 205a would request that access control system 204 evaluate the context of the new email against the applicable policies. Assuming the new email is classified as a secret customer email, this evaluation would result in the new email not being made accessible to Joe User (because it is secret) but being made accessible to the second delegate. Accordingly, the present invention can allow the account owner to define a chain of delegates having different levels of access to ensure that at least one delegate will obtain access to the account owner's content.

Although the present invention has primarily been described in the context of Microsoft Outlook and the delegation of access to an inbox, these same techniques can be implemented to limit delegation in any context. For example, an account owner may desire to delegate access to his or her private or shared folders (including document management system content such as SharePoint content). In such cases, whenever the delegate attempts to access a folder to which access has been delegated, the process described above can be implemented to limit which items within the folder will be made accessible to the delegate.

Figure 5:
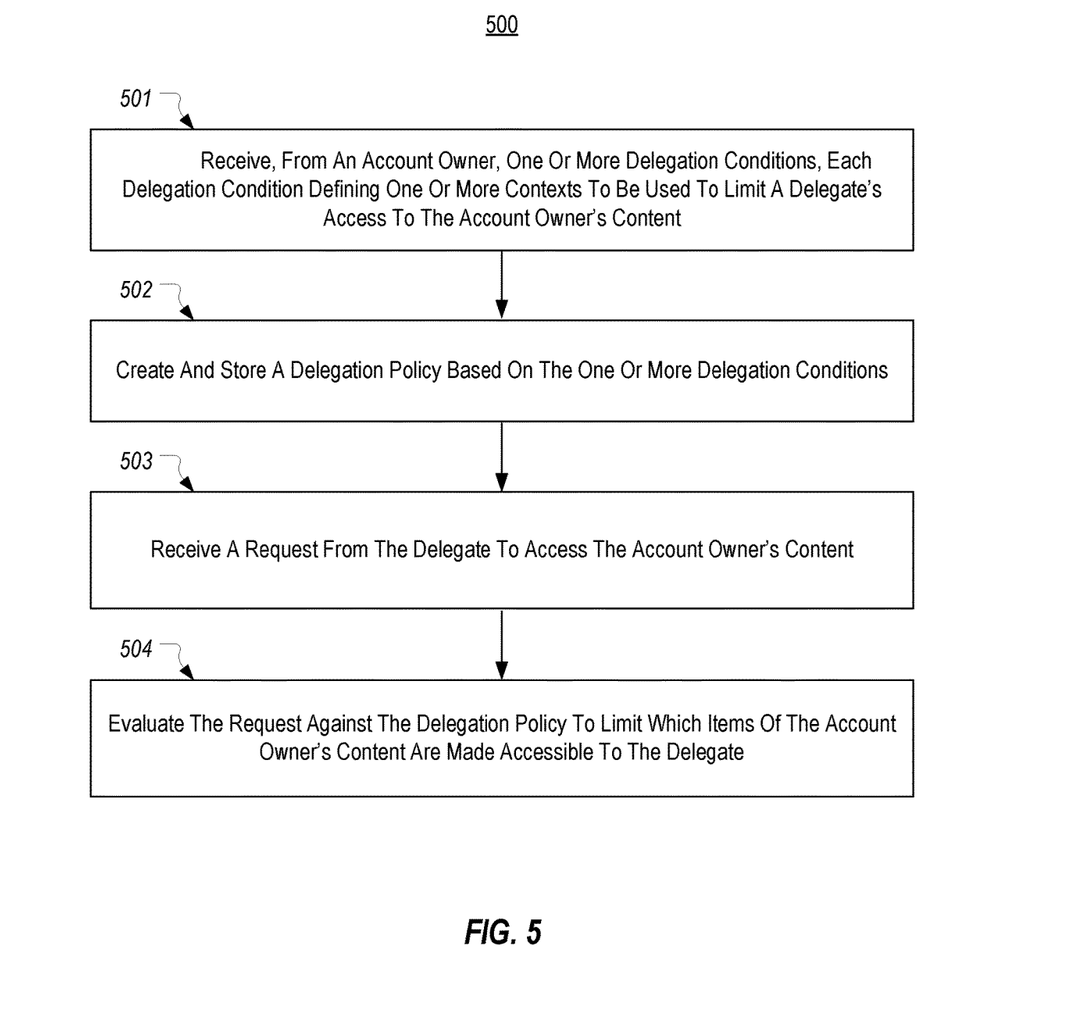
FIG. 5 illustrates a flowchart of an example method for creating and applying a delegation policy.

FIG. 5 illustrates a flowchart of an example method 500 for creating and applying a delegation policy. As an example, method 500 will be described with reference to FIGS. 3B and 4A-4D.

Method 500 includes an act 501 of receiving, from an account owner, one or more delegation conditions, each delegation condition defining one or more contexts to be used to limit a delegate's access to the account owner's content. For example, the account owner can employ user interface 350 displayed on client 202 to specify a delegation condition that indicates that the delegation should be limited to content and/or users matching a particular context.

Method 500 includes an act 502 of creating and storing a delegation policy based on the one or more delegation conditions. For example, the delegation condition can be provided by client 202 to delegation engine 201 which can then create policy 401 for storage in delegation policy store 201a.

Method 500 includes an act 503 of receiving a request from the delegate to access the account owner's content. For example, a delegate may attempt to access the account owner's inbox as a delegate from client 402 which may cause a request to load the contents of the account owner's inbox to be sent to content storage 205a.

Method 500 includes an act 504 of evaluating the request against the delegation policy to limit which items of the account owner's content are made accessible to the delegate. For example, access control system 204 can obtain policy

401 and any necessary context to determine which items of content should be made accessible to the delegate on client 402.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for creating and applying a delegation policy comprising:

in a system that includes content storage in which the content is stored, an access control system that the content storage employs to determine whether to grant access to the content, a delegation engine by which delegation policies are created, and a delegation policy store in which the delegation policies are stored;

receiving, by the delegation engine and from a client computing device employed by an account owner, one or more delegation conditions, each delegation condition defining one or more contexts to be used to limit a delegate's access to the account owner's content, the account owner's content including one or both of emails or files;

creating, by the delegation engine, and storing, within the delegation policy store, a delegation policy based on the one or more delegation conditions to thereby enable the delegation policy to be used to govern the delegate's access to the account owner's content;

after the delegation policy has been created and stored in the delegation policy store and in response to a request received from a client computing device employed by a delegate to access the account owner's content that is stored in the content storage, retrieving, by the access control system, the delegation policy from the delegation policy store;

identifying, by the access control system, the one or more defined contexts of each delegation condition in the delegation policy;

sending, by the access control system and to the delegation engine, a request to retrieve the one or more defined contexts;

retrieving, by the delegation engine, the one or more defined contexts from one or more context providers;

sending, by the delegation engine and to the access control system, the one or more retrieved contexts;

evaluating, by the access control system, the account owner's content in view of the one or more retrieved contexts to thereby identify items of the account owner's content that are to be made accessible to the delegate as well as items of the account owner's content that are not to be made accessible to the delegate; and instructing the content storage to provide, to the client computing device employed by the delegate, only items of the account owner's content that were identified as items that are to be made accessible to the delegate.

2. The method of claim 1, wherein the one or more contexts comprise a context of the account owner's content.

3. The method of claim 1, wherein the one or more contexts comprise a context of the delegate.

4. The method of claim 1, wherein the access control system retrieves the delegation policy in response to a request from the content storage that identifies the account's content.

5. The method of claim 1, wherein the one or more content providers comprise multiple content providers.

6. The method of claim 1, wherein the account owner's content comprises emails and the one or more contexts comprise one or more of a source or classification of the emails.

7. The method of claim 1, wherein the account owner's content comprises files and the one or more contexts comprise a classification of the files.

8. The method of claim 1, wherein identifying items of the account owner's content that are to be made accessible to the delegate comprises identifying items that match each of the one or more retrieved contexts.

9. The method of claim 1, wherein identifying items of the account owner's content that are not to be made accessible to the delegate comprises identifying items that do not match at least one of the one or more retrieved contexts.

10. The method of claim 8, wherein the one or more contexts comprise a business organization structure associated with the items and the delegate.

11. The method of claim 8, wherein the one or more contexts comprise a role of the delegate.

12. The method of claim 8, wherein the one or more contexts comprise a trust level of the delegate.

13. The method of claim 1, wherein the request received from the client computing device employed by the delegate comprises a request to load the account owner's inbox.

14. The method of claim 1, wherein the delegation policy is structured in accordance with one of XACML, SAML, OAuth 2.0, or OpenID.

15. One or more non-transitory computer storage media storing computer-executable instructions which when executed by one or more processors implement a method for creating and applying a delegation policy comprising:
   in a system that includes content storage in which the content is stored, an access control system that the content storage employs to determine whether to grant access to the content, a delegation engine by which delegation policies are created, and a delegation policy store in which the delegation policies are stored;
   receiving, by the delegation engine and from a client computing device employed by an account owner, one or more delegation conditions, each delegation condition defining one or more contexts to be used to limit a delegate's access to the account owner's content, the account owner's content including one or both of emails or files;
   creating, by the delegation engine, and storing, within the delegation policy store, a delegation policy based on the one or more delegation conditions to thereby enable the delegation policy to be used to govern the delegate's access to the account owner's content;
   after the delegation policy has been created and stored in the delegation policy store and in response to a request received from a client computing device employed by a delegate to access the account owner's content that is stored in the content storage, retrieving, by the access control system, the delegation policy from the delegation policy store;
   identifying, by the access control system, the one or more defined contexts of each delegation condition in the delegation policy;
   sending, by the access control system and to the delegation engine, a request to retrieve the one or more defined contexts;
   retrieving, by the delegation engine, the one or more defined contexts from one or more context providers;
   sending, by the delegation engine and to the access control system, the one or more retrieved contexts;
   evaluating, by the access control system, the account owner's content in view of the one or more retrieved contexts to thereby identify items of the account owner's content that are to be made accessible to the delegate as well as items of the account owner's content that are not to be made accessible to the delegate; and
   instructing the content storage to provide, to the client computing device employed by the delegate, only items of the account owner's content that were identified as items that are to be made accessible to the delegate.

16. The computer storage media of claim 15, wherein the one or more contexts comprise a context of the account owner's content.

17. The computer storage media of claim 15, wherein the one or more contexts comprise a context of the delegate.

18. The computer storage media of claim 15, wherein the access control system retrieves the delegation policy in response to a request from the content storage that identifies the account owner's content.

19. The computer storage media of claim 15, wherein the one or more context providers comprise multiple context providers.

20. A method for creating and applying a delegation policy governing a delegate's access to an inbox, the method comprising:
   in a system that includes content storage in which content of an inbox is stored, an access control system that the content storage employs to determine to which items in the inbox a delegate should have access, a delegation engine by which delegation policies are created, and a delegation policy store in which the delegation policies are stored;
   receiving, by the delegation engine and from a client computing device employed by an account owner, one or more delegation conditions, each delegation condition defining one or more contexts to be used to limit a delegate's access to the account owner's inbox;
   creating, by the delegation engine, and storing, within the delegation policy store, a delegation policy based on the one or more delegation conditions to thereby enable the delegation policy to be used to govern the delegate's access to items in the account owner's inbox, the items including emails;
   after the delegation policy has been created and stored in the delegation policy store and in response to a request received from a client computing device employed by a delegate to load the account owner's inbox, retrieving, by the access control system, the delegation policy from the delegation policy store;
   identifying, by the access control system, the one or more defined contexts of each delegation condition in the delegation policy;
   sending, by the access control system and to the delegation engine, a request to retrieve the one or more defined contexts;
   retrieving, by the delegation engine, the one or more defined contexts from one or more context providers;
   sending, by the delegation engine and to the access control system, the one or more retrieved contexts;
   evaluating, by the access control system, items in the account owner's inbox in view of the one or more retrieved contexts to thereby identify items of the account owner's inbox that are to be made accessible to the delegate as well as items of the account owner's inbox that are not to be made accessible to the delegate; and
   instructing the content storage to provide, to the client computing device employed by the delegate, only items of the account owner's inbox that were identified as items that are to be made accessible to the delegate.

* * * * *